United States Patent
Shin (10) Patent No.: US 12,456,494 B2
(45) Date of Patent: Oct. 28, 2025

(54) APPARATUS FOR PLAYING EXTENDED TIMEMARK VIEW BASED ON PLAYBACK SCORE

(71) Applicant: Hoorang Shin, Jeju-si (KR)

(72) Inventor: Hoorang Shin, Jeju-si (KR)

(73) Assignee: INU C INC., Seoul (KR)

( * ) Notice: Subject to any disclaimer, the term of this patent is extended or adjusted under 35 U.S.C. 154(b) by 173 days.

(21) Appl. No.: 18/396,491

(22) Filed: Dec. 26, 2023

(65) Prior Publication Data

US 2025/0201278 A1    Jun. 19, 2025

(30) Foreign Application Priority Data

Dec. 14, 2023   (KR) .......................... 10-2023-0181788

(51) Int. Cl.
*G11B 27/34*  (2006.01)
*G06V 20/40*  (2022.01)
(52) U.S. Cl.
CPC .............. *G11B 27/34* (2013.01); *G06V 20/44* (2022.01); *G06V 20/46* (2022.01)

(58) Field of Classification Search
CPC .......... G11B 27/34; G06V 20/46; G06V 20/44
See application file for complete search history.

(56) References Cited

U.S. PATENT DOCUMENTS

| | | | |
|---|---|---|---|
| 2008/0193016 A1* | 8/2008 | Lim | G06F 16/7834 382/190 |
| 2019/0005833 A1* | 1/2019 | Das | G09B 19/003 |
| 2022/0319174 A1* | 10/2022 | Chacko | G06V 20/46 |

* cited by examiner

*Primary Examiner* — Girumsew Wendmagegn
(74) *Attorney, Agent, or Firm* — PARK LAW FIRM (57) ABSTRACT

Disclosed is an apparatus for playing an extended timemark view based on playback score. An embodiment of the present invention provides an apparatus for playing an extended timemark view based on playback score, which is capable of: extracting an event from an upload video, and then setting a timemark for each event; extending and outputting a timemark-related image and text together when a viewer watches the upload video; and continuously changing the timemark according to the viewer's watching pattern.

7 Claims, 9 Drawing Sheets

APPARATUS FOR PLAYING EXTENDED TIMEMARK VIEW BASED ON PLAYBACK SCORE

BACKGROUND OF THE INVENTION

1. Field of the Invention

One embodiment of the present invention relates to an apparatus for playing an extended timemark view based on playback score.

2. Description of the Prior Art

The content described below simply provides background information related to the present embodiment and does not constitute the related art.

An extended reality environment expands a video viewing area to a 360° space in a plane. The extended reality environment enables a viewing method to also utilize the expanded space while expanding the viewing area. The extended reality environment converts into an extended view form so that a viewer may watch an image on a left side and a text view on a right side together while watching a video.

In general, in order to extend a video viewing area, a user terminal is required in advance to manually expand a flat video into the video viewing area of a 360° space and then register and distribute the same.

In a conventional extended reality environment, when the flat video is extended and then distributed, there is a problem in that a timemark view added to the extended video is fixed, thus making it difficult to further modify the extended video.

SUMMARY OF THE INVENTION

An object of the present embodiment is to provide an apparatus for playing an extended timemark view based on playback score, which is capable of: extracting an event from an upload video, and then setting a timemark for each event; extending and outputting a timemark-related image and text together when a viewer watches the upload video; and continuously changing the timemark according to the viewer's watching pattern.

According to one aspect of the present embodiment, there may be provided an apparatus for playing an extended timemark view, which includes: a video uploading unit for receiving an input of an upload video from a user terminal; an event extracting unit for extracting a plurality of events from the upload video; a keyword selecting unit for selecting a keyword corresponding to each of the plurality of events; an extended timemark unit for extracting a keyword-related image and a keyword-related text corresponding to the keyword for each of the timemark and then further matching the extracted keyword-related image and keyword-related text to the timemark; and an extended timemark view control unit for outputting the keyword-related image and the keyword-related text together in an extended timemark view upon an advent of the timemark when any viewer plays the upload video.

As described above, according to the present embodiment, there is an effect of: extracting an event from an upload video, and then setting a timemark for each event; extending and outputting a timemark-related image and text together when a viewer watches the upload video; and continuously changing the timemark according to the viewer's watching pattern.

DETAILED DESCRIPTION OF THE INVENTION

Hereinafter, the present embodiment will be described in more detail with reference to the accompanying drawings.

Figure 1:
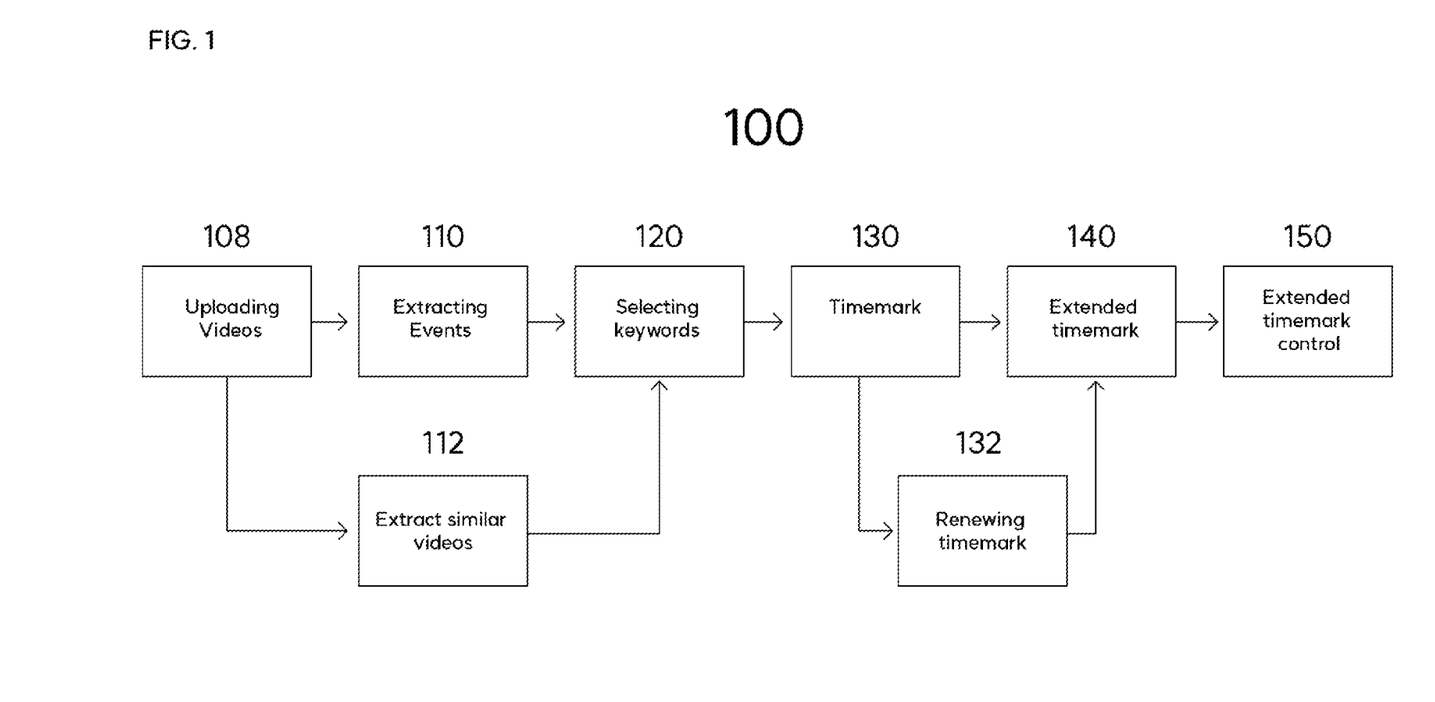
FIG. 1 is a view showing an apparatus for extracting a timemark view according to the present embodiment.

FIG. 1 is a view showing an apparatus for extracting a timemark view according to the present embodiment.

An extended timemark view playing apparatus 100 may extract an event from an upload video. The extended timemark view playing apparatus 100 may match a timemark for each keyword corresponding to the event extracted from the video. The extended timemark view playing apparatus 100 may extract a keyword-related image and a keyword-related text corresponding to the time mark, and then further match the extracted keyword-related image and keyword-related text to the timemark. The extended timemark view playing apparatus 100 may output the keyword-related image and the keyword-related text, which are matched to the timemark, in an extended timemark view upon an advent of a timemark when any viewer plays the upload video.

The extended timemark view playing apparatus 100 may continuously change the keyword matched to the timemark according to the viewer's watching pattern. The extended timemark view playing apparatus 100 may additionally recognize various events in the video to change keywords corresponding to the events, and then match the timemark again.

The extended timemark view playing apparatus 100 according to the present embodiment may include a video uploading unit 108, an event extracting unit 110, a similar video extracting unit 112, a keyword selecting unit 120, a timemark unit 130, a timemark updating unit 132, an extended timemark unit 140, and an extended timemark view control unit 150. Components included in the extended timemark view playing apparatus 100 may not be necessarily limited thereto.

Each component included in the extended timemark view playing apparatus 100 may be connected to a communication path connecting a software module or a hardware module inside the apparatus and may be organically operated with each other. These components may communicate using one or more communication buses or signal lines.

Each component of the extended timemark view playing apparatus 100 shown in FIG. 1 may refer to a unit in which at least one function or operation is processed, and may be implemented as a software module, a hardware module, or a combination of software and hardware.

The video uploading unit 108 may receive an input of an upload video from a user terminal. The video uploading unit 108 may also receive an input of metadata for the upload video from the user terminal.

When the video is uploaded from the user terminal, the video uploading unit 108 may also receive an input of metadata including at least one or more of a category, a title, a description, a tag, a timemark keyword, and a file name for the upload video.

The event extracting unit 110 may extract a plurality of events from the upload video. When the video is uploaded, the event extracting unit 110 may extract an event based on a category of video, a sound of explosion, a text frequently used, and a tag registered by admin for the corresponding video.

The similar video extracting unit 112 may extract a similar video from a plurality of videos stored in a separate storage based on metadata. The similar video extracting unit 112 may extract a timemark of a video similar to metadata and a related keyword search record from a separate storage.

The keyword selecting unit 120 may select a corresponding keyword for each of the plurality of events. The keyword selecting unit 120 may select a keyword for each of the plurality of events based on metadata.

The keyword selecting unit 120 may convert a speech of the upload video into a text (Speech to the text). The keyword selecting unit 120 may select a keyword for each event in the upload video based on a related keyword search record (reference keyword) of a video similar to the converted text and metadata.

The timemark unit 130 may match a timemark for each keyword. The timemark unit 130 may generate a timemark table in which a timemark is matched to each keyword selected for each event in the upload video.

The timemark unit 130 may generate a $1^{st}$ timemark table which matches each timemark based on a timemark of a video similar to metadata corresponding to each keyword selected for each event in the upload video.

The timemark updating unit 132 may continuously change the keyword selected in the upload video according to the viewer's watching pattern with respect to the upload video. The timemark updating unit 132 may generate a new timemark table whenever the keyword matched to the timemark is changed.

The timemark updating unit 132 may generate an $N^{th}$ timemark table in which a keyword selected for each event in the upload video is changed by scoring a viewing volume, the number of timemark clicks (timemark amount), and the number of playback stop clicks (playback control) for each time while a viewing record (log) of the upload video is accumulated.

The extended timemark unit 140 may extract a keyword-related image and a keyword-related text corresponding to a keyword for each timemark, and then further match the extracted keyword-related image and keyword-related text to the timemark.

The extended timemark view control unit 150 may output the keyword-related image and the keyword-related text together in an extended timemark view upon an advent of a timemark when any viewer plays the upload video.

The extended timemark view control unit 150 may display an extended timemark view including the keyword-related image and the keyword-related text based on the most recently generated new timemark table when any viewer plays the corresponding upload video.

The extended timemark view control unit 150 may display the extended timemark view based on the most recently generated $N^{th}$ timemark table when any user plays a corresponding video for watching.

The extended timemark view control unit 150 may perform an event use process for the upload video. The extended timemark view control unit 150 may automatically determine a device which any user watches.

When a playing device is a PC, the extended timemark view control unit 150 may output an extended timemark view (a keyword-related image and a keyword-related text) to the right or left side of the video without separate setting of the user terminal. When a playing device is a mobile, the extended timemark view control unit 150 may output an extended timemark view (a keyword-related image and a keyword-related text) in the form of a lower end play bar overlay without separate setting of the user terminal. When a playing device is a TV, the extended timemark view control unit 150 may output an extended timemark view (a keyword-related image and a keyword-related text) in the form of a lower end direction key overlay without separate setting of the user terminal. When a playing device is a head mounted display (HMD), mixed reality (MR) device, the extended timemark view control unit 150 may output an extended timemark view (a keyword-related image and a keyword-related text) in a space on the left and right sides of the video without separate setting of the user terminal.

Figure 2:
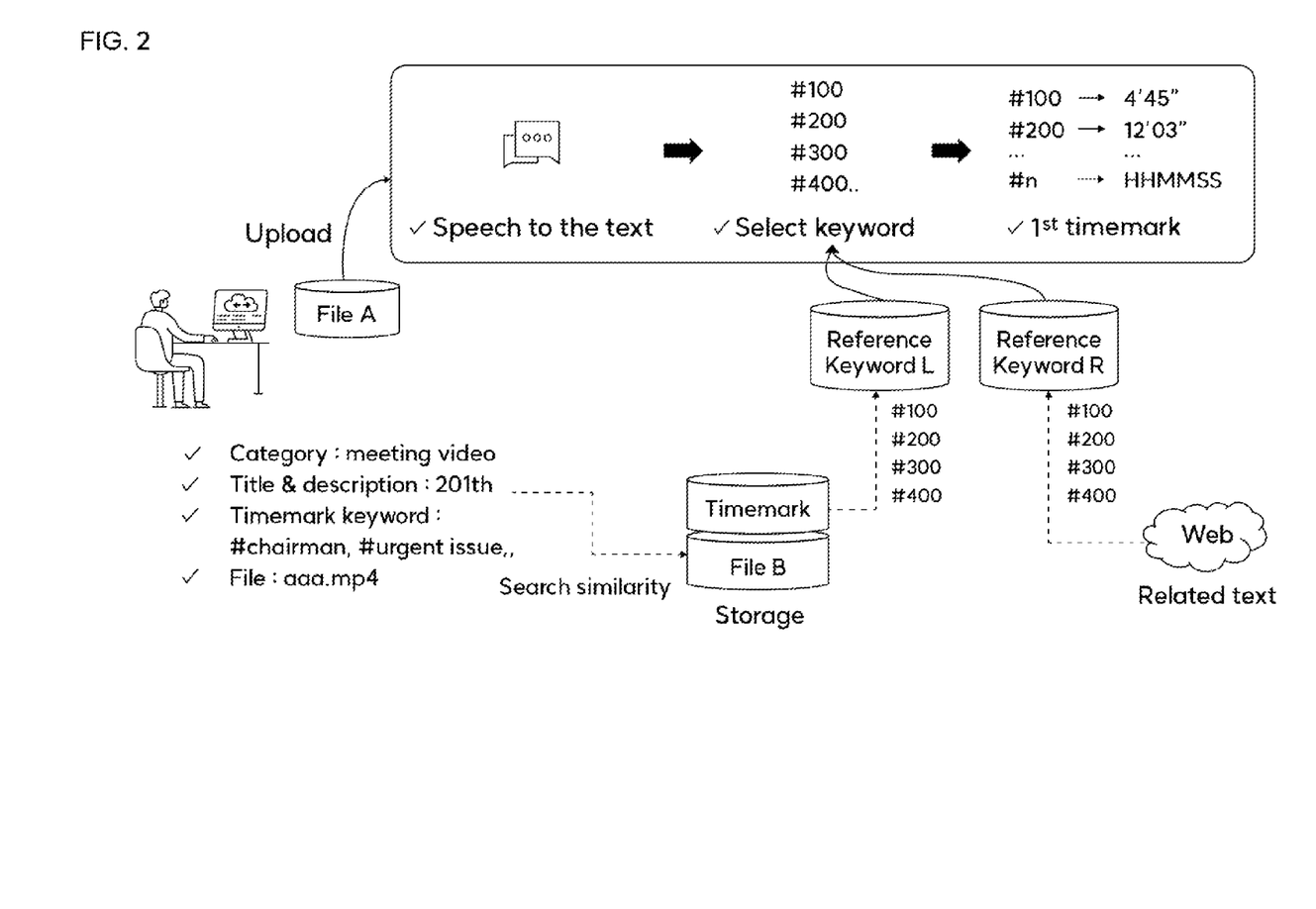
FIG. 2 is a view showing a process for generating a first timemark according to the present embodiment.

FIG. 2 is a view showing a process for generating a first timemark according to the present embodiment.

The extended timemark view playing apparatus 100 may extract an event for an upload video. The extended timemark view playing apparatus 100 may receive an upload video from a user terminal.

When the video is uploaded, the extended timemark view playing apparatus 100 may also receive metadata including at least one or more of a category, a title, a description, a tag, a time-mark keyword, and a file name for the video.

The extended timemark view playing apparatus 100 may extract a similar video from a plurality of videos stored in a separate storage based on metadata. The extended timemark view playing apparatus 100 may extract a timemark of a video similar to metadata and a related keyword search record from a separate storage.

The extended timemark view playing apparatus 100 may convert a speech of the upload video into text (Speech to the text). The extended timemark view playing apparatus 100 may select a keyword for each event in the upload video based on a related keyword search record (reference keyword) of a video similar to the converted text and metadata.

The extended timemark view playing apparatus 100 may generate a $1^{st}$ timemark table which matches each timemark based on a timemark of a video similar to metadata corresponding to each keyword selected for each event in the upload video.

Figure 3:
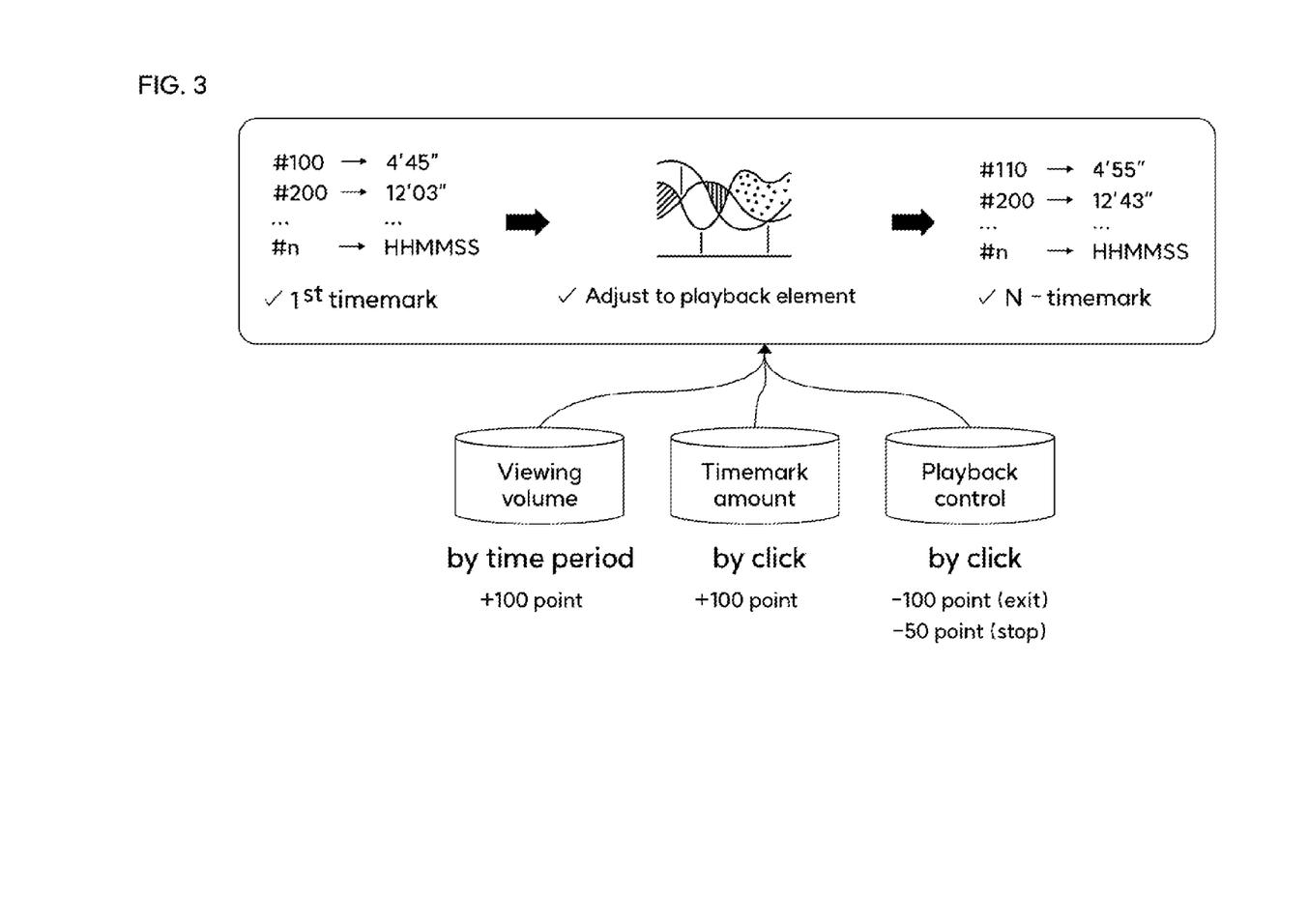
FIG. 3 is a view showing a process for generating an $N^{th}$ timemark according to the present embodiment.

FIG. 3 is a view showing a process for generating an $N^{th}$ timemark according to the present embodiment.

The extended timemark view playing apparatus 100 may generate an $N^{th}$ timemark table in which a keyword selected for each event in the upload video is changed by scoring a viewing volume, the number of timemark clicks (timemark amount), and the number of playback stop clicks (playback control) for each time while a viewing record (log) of the upload video is accumulated.

The extended timemark view playing apparatus 100 may display the extended timemark view based on the most recently generated N$^{th}$ timemark table when any user plays a corresponding video for watching.

Figure 4:
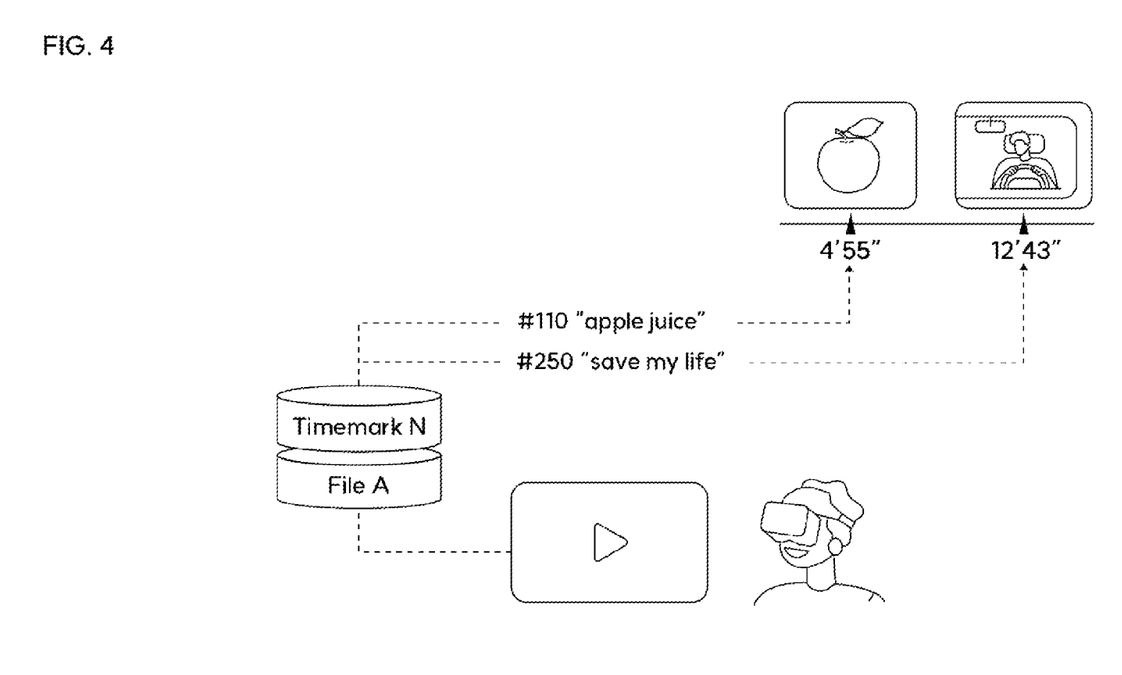
FIG. 4 is a view showing an $N^{th}$ timemark viewing generated based on a playback time according to the present embodiment.

FIG. 4 is a view showing an N$^{th}$ timemark viewing generated based on a playback time according to the present embodiment.

The extended timemark view playing apparatus 100 may display the extended timemark view based on the most recently generated N$^{th}$ timemark table when any user plays a corresponding video for watching.

The extended timemark view playing apparatus 100 may extract the most recently generated N$^{th}$ timemark table corresponding to the corresponding video when any user plays a certain upload video for watching.

The extended timemark view playing apparatus 100 may display the extended timemark view based on an N$^{th}$ timemark table matched to a certain video when any user plays the certain video.

The extended timemark view playing apparatus 100 may output the keyword-related image and the keyword-related text, which are matched to the timemark, in an extended timemark view upon an advent of a timemark time for each keyword corresponding to each event included in an N$^{th}$ timemark table along with a certain video.

For example, the extended timemark view playing apparatus 100 may output the most recently matched keyword-related image #100 and the keyword-related text "Apple Juice" in an N$^{th}$ timemark table upon an advent of a timemark time 4'55" for each keyword corresponding to each event included in an N$^{th}$ timemark table along with a certain video.

For example, the extended timemark view playing apparatus 100 may output the most recently matched keyword-related image #250 and the keyword-related text "Save My Life" in an N$^{th}$ timemark table upon an advent of a timemark time 12'43" for each keyword corresponding to each event included in an N$^{th}$ timemark table along with a certain video.

Figure 5:
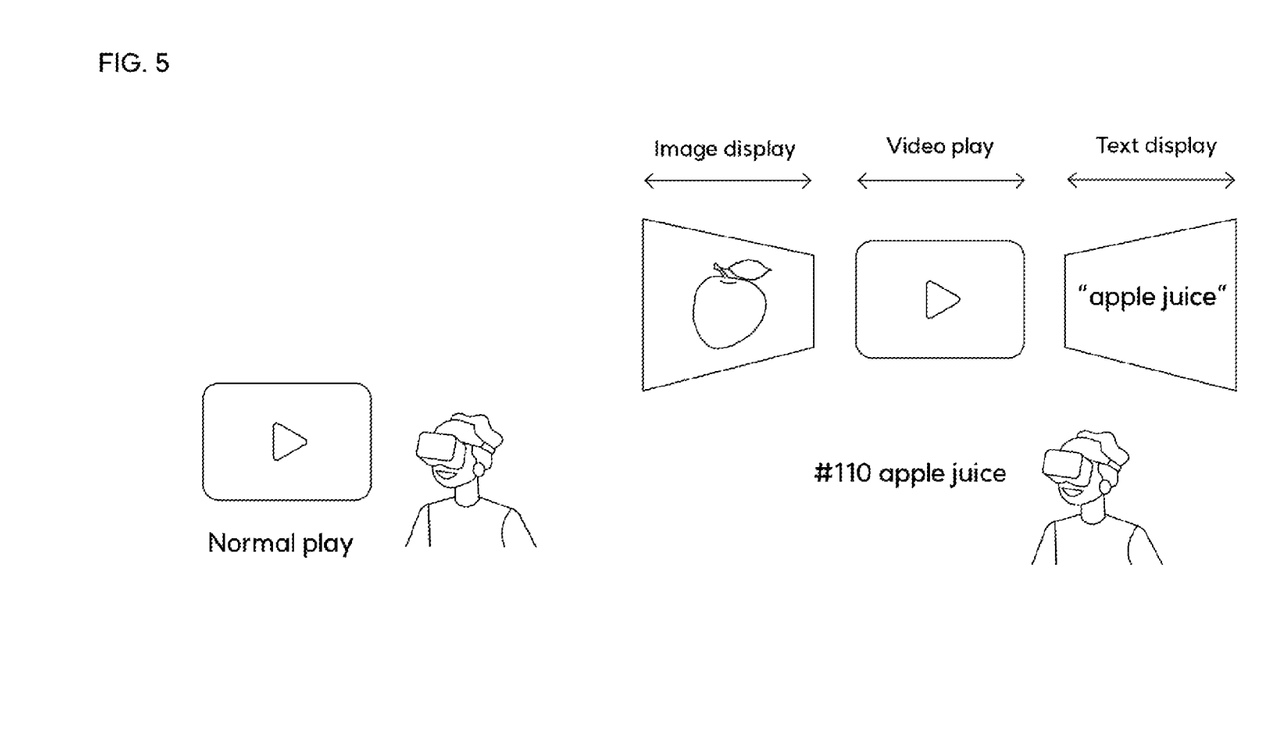
FIG. 5 is a view showing an extended timemark view in which an image and a text are simultaneously exposed in a spatial computing environment according to the present embodiment.

FIG. 5 is a view showing an extended timemark view in which an image and a text are simultaneously exposed in a spatial computing environment according to the present embodiment.

The extended timemark view playing apparatus 100 may perform an event use process for the upload video. The extended timemark view playing apparatus 100 may automatically determine a device which any user watches.

When a playing device is a PC, the extended timemark view playing apparatus 100 may output an extended timemark view (a keyword-related image and a keyword-related text) to the right or left side of the video without separate setting of the user terminal.

When a playing device is a mobile, the extended timemark view playing apparatus 100 may output an extended timemark view (a keyword-related image and a keyword-related text) in the form of a lower end play bar overlay without separate setting of the user terminal.

When a playing device is a TV, the extended timemark view playing apparatus 100 may output an extended timemark view (a keyword-related image and a keyword-related text) in the form of a lower end direction key overlay without separate setting of the user terminal.

When a playing device is a head mounted display (HMD), mixed reality (MR) device, the extended timemark view playing apparatus 100 may output an extended timemark view (a keyword-related image and a keyword-related text) in a space on the left and right sides of the video without separate setting of the user terminal.

As shown in FIG. 5, when a user plays an upload video while wearing a head mounted display (HMD) and mixed reality (MR) device, the extended timemark view playing apparatus 100 may play the video in a center, and then output a keyword-related image (Apple Juice) corresponding to the timemark (04'55") on a left screen, and output a keyword-related text ("Apple Juice") corresponding to the timemark (04'55") on a right screen upon an advent of the corresponding timemark (04'55") while playing the video in the center.

Figure 6:
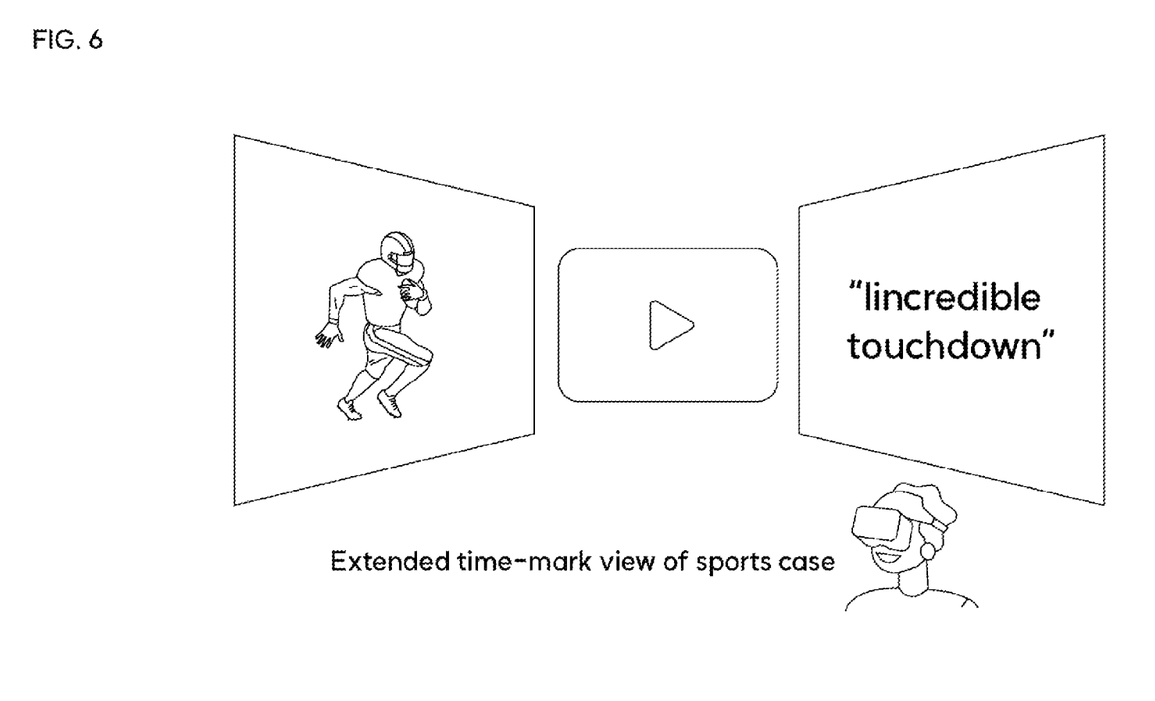
FIG. 6 is a view showing an extended timemark view on a sports video according to the present embodiment.

FIG. 6 is a view showing an extended timemark view on a sports video according to the present embodiment.

As shown in FIG. 6, the extended timemark view playing apparatus 100 may set keywords as "touchdown" and "scoring success" for each event in an uploaded football video.

For example, the extended timemark view playing apparatus 100 may output, in the extended timemark view, a timemark of a "touchdown," which is a keyword corresponding to an event included in the most recently generated N$^{th}$ timemark table, and a "touchdown image" and a "touchdown text," which are the most recently matched to the N$^{th}$ timemark table based on a time point at which a viewer plays a sports video.

The extended timemark view playing apparatus 100 may output, in the extended timemark view, a timemark of a "scoring success," which is a keyword corresponding to an event included in the most recently generated N$^{th}$ timemark table, and a "scoring success image" and a "scoring success text," which are the most recently matched to the N$^{th}$ timemark table based on a time point at which a viewer plays a sports video.

Figure 7:
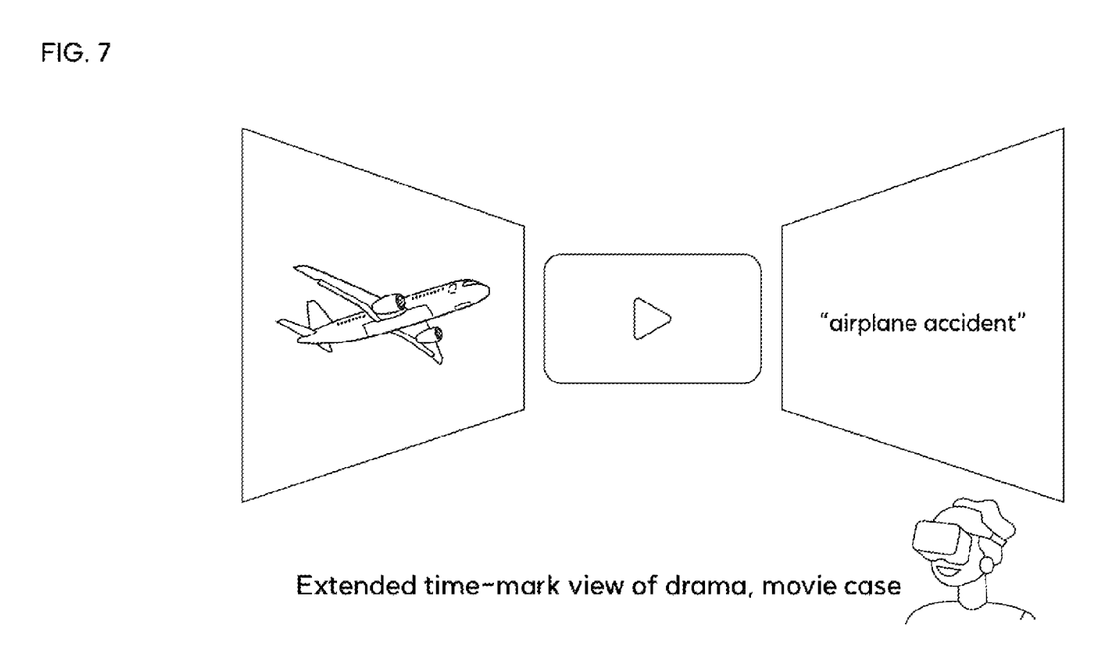
FIG. 7 is a view showing an extended timemark view on a drama and a movie according to the present embodiment.

FIG. 7 is a view showing an extended timemark view on a drama and a movie according to the present embodiment.

As shown in FIG. 7, the extended timemark view playing apparatus 100 may set keywords as "airplane accident," "death of a godfather," and "revenge of a competitive organization" for each event in an uploaded drama video and movie video.

For example, the extended timemark view playing apparatus 100 may output, in the extended timemark view, an "airplane accident image" and an "airplane accident text," which are the most recently matched to the N$^{th}$ timemark table by reflecting a result of scoring a viewing volume, the number of timemark clicks (timemark amount), and the number of playback stop clicks (playback control) for each time based on an accumulated viewing record (log) of the "airplane accident," which is a keyword corresponding to an event included in the most recently generated N$^{th}$ timemark table based on a time point at which a viewer plays a drama video and a movie video.

The extended timemark view playing apparatus 100 may output, in the extended timemark view, a "death of a godfather image" and a "death of a godfather text," which are the most recently matched to the N$^{th}$ timemark table by reflecting a result of scoring a viewing volume, the number of timemark clicks (timemark amount), and the number of playback stop clicks (playback control) for each time based on an accumulated viewing record (log) of the "death of a godfather," which is a keyword corresponding to an event included in the most recently generated N$^{th}$ timemark table based on a time point at which a viewer plays a drama video and a movie video.

The extended timemark view playing apparatus 100 may output, in the extended timemark view, a "revenge of a competitive organization image" and a "revenge of a competitive organization text," which are the most recently matched to the N$^{th}$ timemark table by reflecting a result of scoring a viewing volume, the number of timemark clicks (timemark amount), and the number of playback stop clicks (playback control) for each time based on an accumulated viewing record (log) of the "revenge of a competitive organization," which is a keyword corresponding to an event included in the most recently generated $N^{th}$ timemark table based on a time point at which a viewer asks for playing.

Figure 8:
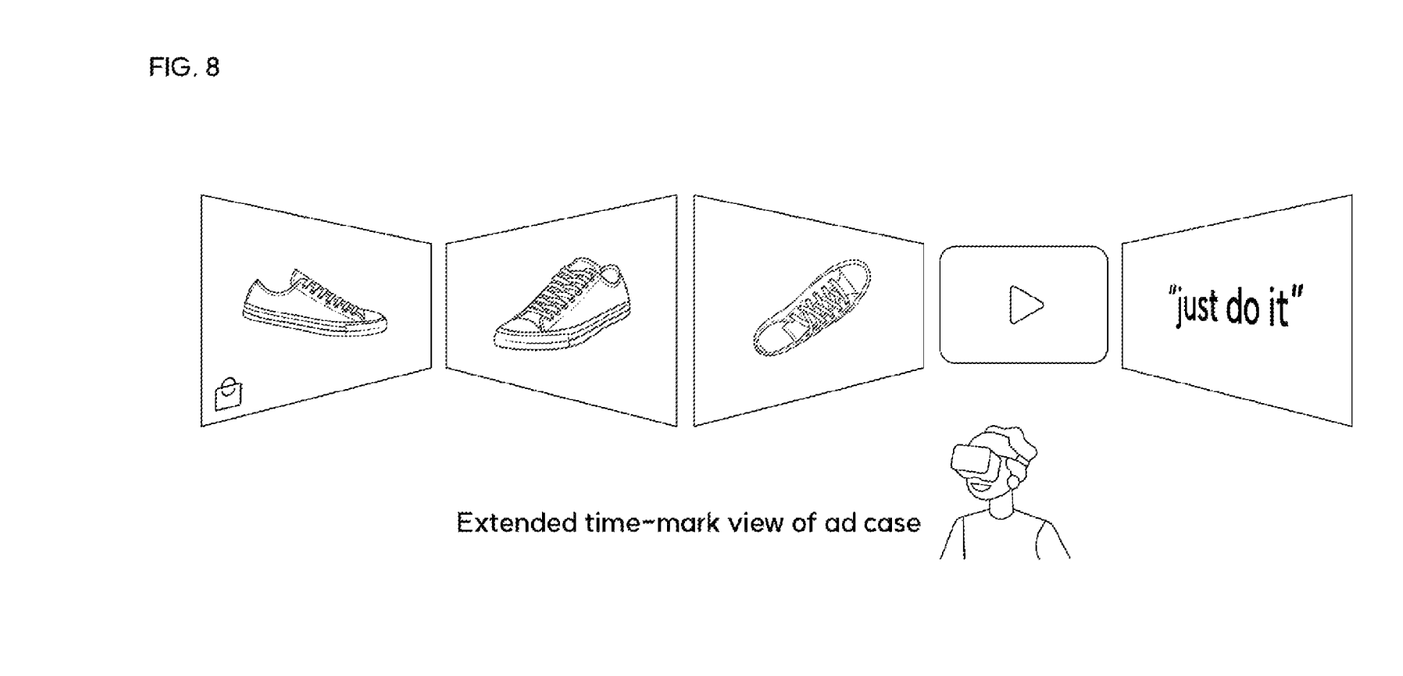
FIG. 8 is a view showing an extended timemark view on an advertising video according to the present embodiment.

FIG. 8 is a view showing an extended timemark view on an advertising video according to the present embodiment.

As shown in FIG. 8, the extended timemark view playing apparatus 100 may set a keyword as a "certain product name" for each event in an uploaded advertising video.

For example, the extended timemark view playing apparatus 100 may output, in the extended timemark view, a timemark of a "certain product name," which is a keyword corresponding to an event included in the most recently generated $N^{th}$ timemark table, and a "certain product image" and a "certain product copy phrase," which are the most recently matched to the $N^{th}$ timemark table based on a time point at which a viewer plays an advertising video.

When outputting the "certain product image" and the "certain product copy phrase" in the extended timemark view, the extended timemark view playing apparatus 100 may simultaneously expose a plurality of extended timemark views to arrange images as a panorama.

When outputting the "certain product image" and the "certain product copy phrase" in the extended timemark view, the extended timemark view playing apparatus 100 may arrange "user action click" including a function of purchasing.

Figure 9:
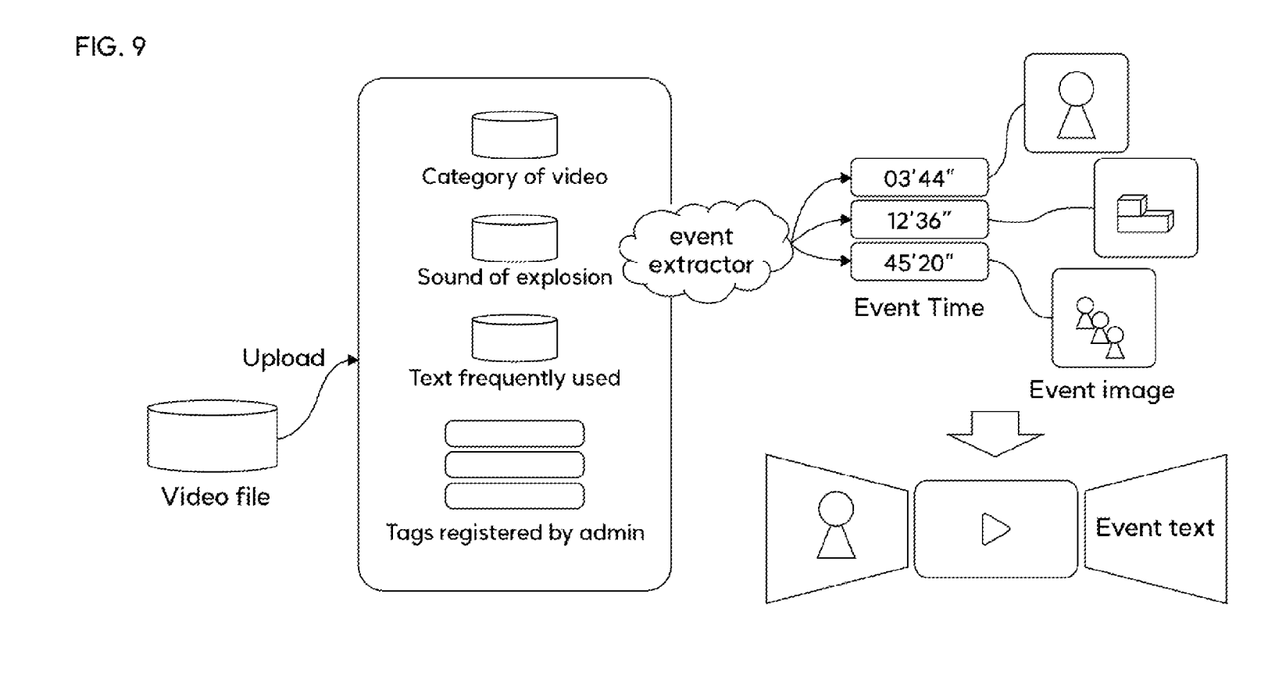
FIG. 9 is a view showing a method for extracting an event for an extended reality video interface and a technology for displaying the same.

FIG. 9 is a view showing a method for extracting an event for an extended reality video interface and a technology for displaying the same.

When the video is uploaded, the extended timemark view playing apparatus 100 may extract an event based on a category of video, a sound of explosion, text frequently used, and a tag registered by admin for the corresponding video.

The extended timemark view playing apparatus 100 may select a keyword for each event for an upload video. The extended timemark view playing apparatus 100 may set a timemark for each keyword for each event. The extended timemark view playing apparatus 100 may extract a keyword-related image and a keyword-related text corresponding to each keyword for each event.

The extended timemark view playing apparatus 100 may output, in the extended timemark view, a timemark of a keyword corresponding to an event included in the most recently generated $N^{th}$ timemark table, and a keyword-related image" and a "keyword-related text," which are the most recently matched to the $N^{th}$ timemark table based on a playing time point when the corresponding upload video is played by another viewer.

The above description is merely illustrative of the technical idea of the present embodiment, and those skilled in the art to which the present embodiment pertains may make various changes and modifications without departing from the essential characteristics of the present embodiment. Thus, the present embodiments are not intended to limit, but intended to explain the technical idea of the present embodiment, and the scope of the technical idea of the present embodiment is not limited thereto. The scope of protection of the present embodiment should be interpreted according to the following claims, and all technical ideas within the scope equivalent thereto should be interpreted as being included in the scope of rights of the present embodiment.

What is claimed is:

1. An apparatus for playing an extended timemark view, the apparatus comprising:
   a video uploading unit for receiving an upload video from a user terminal;
   an event extracting unit for extracting a plurality of events from the upload video;
   a keyword selecting unit for selecting a keyword corresponding to each of the plurality of events;
   a timemark unit for matching a timemark for each of the keyword;
   an extended timemark unit for extracting a keyword-related image and a keyword-related text corresponding to the keyword for each of the timemark and then further matching the extracted keyword-related image and keyword-related text to the timemark; and
   an extended timemark view control unit for outputting the keyword-related image and the keyword-related text together in an extended timemark view upon an advent of the timemark when any viewer plays the upload video.

2. The apparatus of claim 1, further comprising:
   a timemark updating unit for continuously changing the keyword selected in the upload video according to the viewer's watching pattern with respect to the upload video.

3. The apparatus of claim 1, wherein the video uploading unit receives an input of metadata together for the upload video from the user terminal.

4. The apparatus of claim 3, wherein the keyword selecting unit selects the keyword for each of the plurality of events based on the metadata.

5. The apparatus of claim 2, wherein the timemark unit generates a timemark table in which the timemark is matched for each of the keyword selected for each of the event in the upload video.

6. The apparatus of claim 5, wherein the timemark updating unit generates a new timemark table whenever the keyword matched to the timemark is changed.

7. The apparatus of claim 6, wherein the extended timemark view control unit displays an extended timemark view comprising the keyword-related image and the keyword-related text based on a most recently generated new timemark table when any viewer plays the corresponding upload video.

* * * * *